Patented June 21, 1938

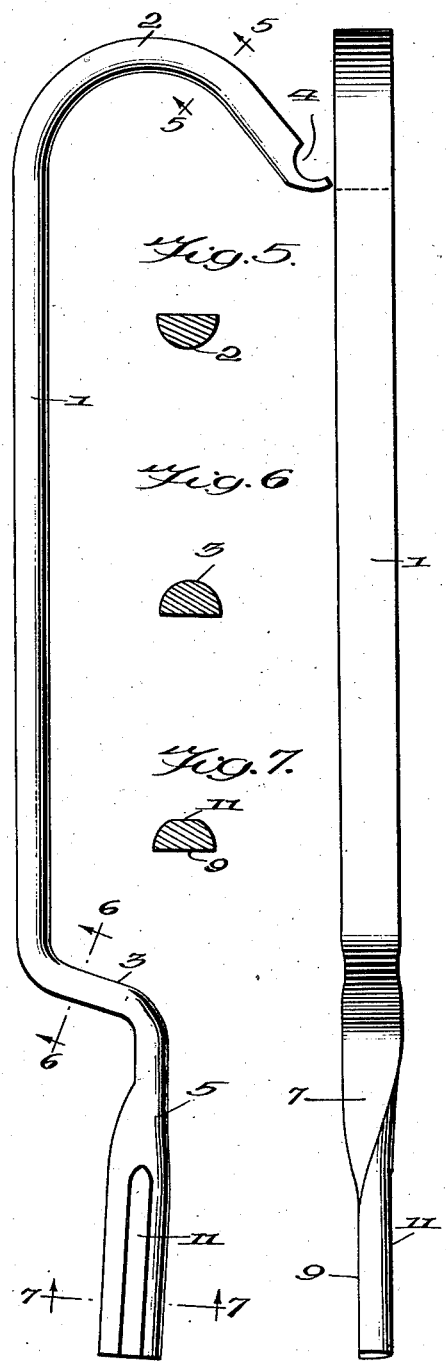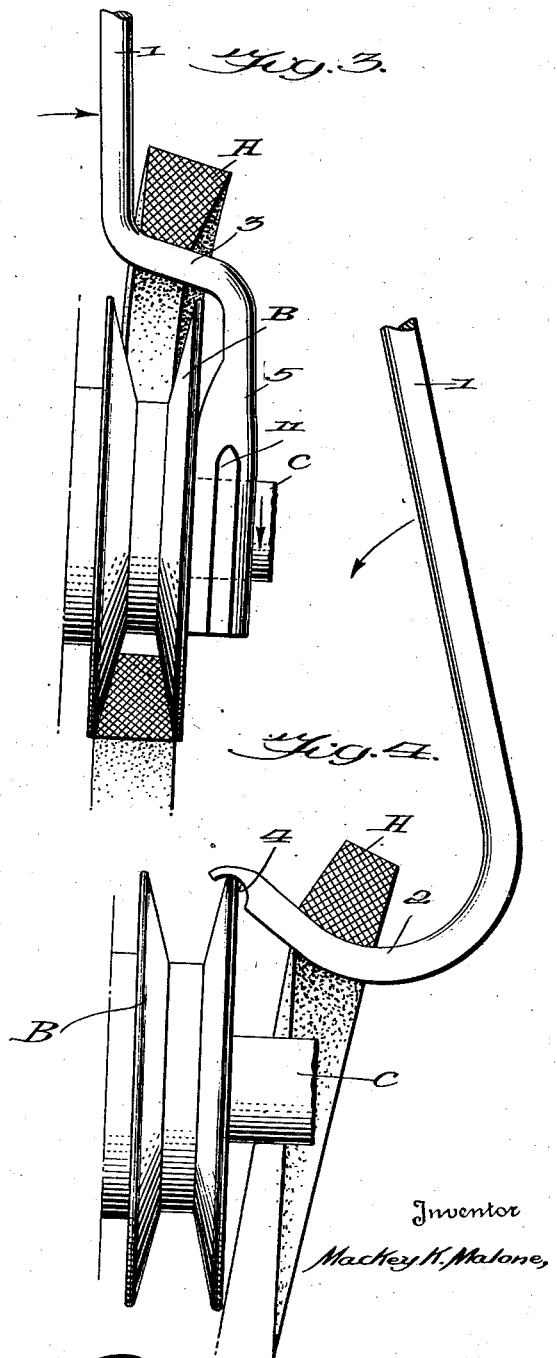

2,121,129

UNITED STATES PATENT OFFICE 2,121,129

DRIVE BELT APPLYING AND REMOVING TOOL

Mackey K. Malone, Wills Point, Tex., assignor to K-D Manufacturing Company, Lancaster, Pa., a corporation of Pennsylvania Application March 24, 1936, Serial No. 70,662

3 Claims. (Cl. 74—242.7)

This invention relates to a drive belt removing and applying tool and in the embodiment illustrated is designed and primarily intended for use in removing and replacing the usual drive belt employed to drive the cooling fan of the usual automobile engine and commonly referred to as the fan belt. In present day automobiles this belt is usually of the so-called V-type, that is of generally V-shape in cross-section. It is driven by a V-type pulley mounted on or driven by the engine crank-shaft, not shown, and passes about a V-type pulley such as B usually mounted on and for rotation with a shaft, not shown, suitably mounted for rotation in bearings supported by the upper front portion of the engine and serves to drive the hub C of the fan, not shown, which hub is usually rigid with and turns with said driven pulley B.

Frequently this drive belt, such as A, in addition to passing about the pulley B and thus serving to drive the fan, also passes about and drives similar driven pulleys to drive water circulation pumps and for other purposes and in order that it may efficiently drive such pulley or pulleys it is necessary that the drive belt shall not have any appreciable slack in it but shall be held in good frictional contact with the driving and driven pulley faces.

Since these drive belts are made as endless loops and are so constructed as to eliminate the defect of stretching, at least so far as commercially practicable and so far as practicable without unduly sacrificing flexibility it has heretofore been a matter of some difficulty and appreciable loss of time to remove an old worn drive or fan belt when it has become so worn as to be inefficient for its purpose and to replace it by a new fan belt, the application of the new fan belt particularly consuming time excessively and requiring excessive effort heretofore in stretching it to pass over the flange of the last pulley to which it is applied due to the fact that the new belts are stiff and hard to stretch, such considerations having heretofore not infrequently resulted in damage to the replacement belts during application.

In most automobiles the driven pulley or one of the driven pulleys is or are made laterally shiftable in position so that by shifting the position of such pulley the slack in the belt incident to its long continued use may be taken up, and it has been usual to adjust the position of such adjustable pulley to such point as would permit the greatest possible amount of slack and then remove and replace the drive or fan belt.

This practice requires the disturbing of the adjustment, the two releasing and locking operations of the adjustment securement means and the two operations of the adjustment means, each such operation in itself requiring appreciable time, plus the risk that on resetting the adjustment the adjustable pulley will be moved too far or not far enough with resultant damage to the bearing of the adjustable pulley in the first case and slipping of the fan belt and inefficient driving of the fan in the second case.

The present invention has been developed with all of the foregoing considerations in mind and has primarily in view to provide a very simple and very efficient tool with the use of which a drive or fan belt may be almost instantaneously removed and almost instantaneously replaced by a new fan belt with extremely little effort without risk of damage to the belt during removal or during replacement or to the new belt substituted for an old worn out belt and without any need to, or advantage to be had by, changing the position or adjustment of the adjustable pulley and without any risk incident to the belt changing operation of a resulting improper adjustment of the adjustable pulley, while at the same time the mechanic is saved the risk of skinning his knuckles, having his hand or hands pinched between the belt and pulley, or otherwise injuring his hands.

In this application I show and describe only the present preferred embodiment of my invention simply by way of illustration of the practice of my invention as by law required. However, I realize that my invention is capable of other and different embodiments, and that the several details thereof may be modified in various ways, all without departing from my said invention. Therefore, the drawing and description herein are to be considered as merely illustrative and not as exclusive.

In the accompanying drawing, wherein Figures 1, 2, and 5 to 7 inclusive and the portions of the tool shown in Figures 3 and 4 are made to actual full size scale from an actual full size tool as now made, sold and used primarily for the field of use above mentioned:

Figure 1 represents a side elevation of a tool embodying my invention;

Figure 2, a rear elevation thereof;

Figure 3, a side elevation showing the tool, broken away, in the initial stage of its use in removing a drive or fan belt, shown cut away and in section, from the fan or driven pulley;

Figure 4, a view similar to Fig. 3 showing the tool as applied in the initial stage of applying the belt to a driven, or fan, pulley;

Figure 5, a sectional view on the line 5—5 of Figure 1;

Figure 6, a view on the line 6—6 of Figure 1; and

Figure 7, a view on line 7—7 of Figure 1.

Referring now in detail to the drawing, A designates the drive, or fan, belt; B, the driven, or fan, pulley; and C, the fan hub, or other element, driven by the pulley B.

The tool of the present invention will preferably have a relatively long stem or shank 1 and will have a relatively short preferably lengthwise curved arm 2, which will preferably be formed by bending the upper end of the shank or stem 1 back toward the lower end in a wide loop with its extreme free end portion straight or almost straight and slanting downwardly away from the shank 1. The upper face of the extreme free end portion of the arm 2 will preferably be formed in such manner or with means to positively mechanically interlock with, or receive, a peripheral portion of one of the flanges of the fan, or driven pulley and to this end will preferably be notched or grooved as at 4. However, while such positive interlock is preferred it is not essential and the same may be entirely omitted, either in its preferred form or any other form serving the same function. Preferably the inner and lower face of the extreme tip or free end of the arm 2 is inclined or rounded off as illustrated, though this is not of particular importance.

The lower end portion of the stem 1 is offset to form an inclined belt engaging face or shoulder 3 and a depending foot 5 to engage the flange or outer side face of the driven, or fan, pulley B and preferably of such length as to engage, and preferably extend beyond the axis of, the fan hub or driven element C.

Preferably the tool will be formed or bent as one integral piece from a single piece of usual commercial stock strap or rod form iron or steel or other suitable metal preferably of half round or semi-spherical shape, or approximately so, in cross-section and of such material or having such characteristics as to be stiff and rigid, or stiffly resilient to suit the tool for use as a prying instrument.

Preferably the foot 5 will have a flat face 9 on one side and a flat face 11 on the other side extending lengthwise of the foot and perpendicular to the front face of the stem or shank 1.

Where approximately semi-spherical in cross-section metal strap or rod stock is used, the shank 5 will preferably have its lower portion presented at right angles to the stem 1 by twisting the shank as at 7 as illustrated in Fig. 2, whereby the flat face of the rod material will serve as the flat face 9.

The flat faces 9 and 11 engage against the peripheral face of the hub C according to the position of the tool and being of substantial width function to prevent twisting of the tool or reduce such tendency to twist to a minimum, during the removal of the belt. Both faces 9 and 11 are provided in order that the tool may be used in any one of several ways according to the needs in a given case. For instance if in a given case it is not practical to apply the tool with its foot 5 in front of the pulley B the tool may be applied with its foot 5 behind the rear face of the pulley B, in which case the flat face 11 would contact with the hub C to the rear of said pulley B, assuming that the tool were used from the same side of the engine.

However, while the provision of the flat faces 9 and 11 is preferred to serve the function stated, such flat faces 9 and 11 are not essential and either or both may be omitted.

Preferably one end portion of the tool will be formed into the short belt applying arm 2 and the other end portion of the tool will be formed with the belt removing shoulder 3 and a foot 5 to engage the side face of the pulley B, but this is not essential considering my invention in its broader aspects, each end portion is used independently of, and alternative with, the other and each might be embodied in a separate distinct tool and perform its own individual function equally well, though considering the matter in a more restricted sense there is an interrelationship of time and convenience between them in that the two operations of first removal and then replacement in most instances are performed as one continuous job without appreciable time interval between them and the provision of the compound tool for performing the two operations ensures having the necessary tool available for both jobs and avoids loss of time in looking for and selecting the proper tools; and also provides economy of manufacture in that the one stem or shank 1 serves for the two operative tool portions.

Preferably all face portions of the tool which engage the belt A, that is the inner or lower face of arm 2 and the upper or outer face of shoulder 3 will be rounded or curved in cross-section so as to avoid injury to the belt A and similarly said faces of said portions 2 and 3 will preferably be smooth and uninterrupted lengthwise for the same reason.

To remove a belt for any reason the foot 5 will be inserted through the loop of the belt with the rear edge of the foot in engagement with the front face of the front flange of the pulley B and with the flat face 9 of the foot 5 resting on the top of the hub C. As thus initially applied, as illustrated in Fig. 3, the tool extends in a substantially horizontal position. Thereafter the shank 1 is to be swung forward in the direction indicated by the upper arrow in Fig. 3 and at the same time the tool is to be moved with a partial rotary movement on its foot 5 above the axis of the hub C in the direction indicated by the lower arrow in Fig. 3, this simple double movement of the tool serving to stretch the belt A radially and forward in advance of the front flange of the pulley B by the shoulder 3 and to roll the belt A by a single quick movement easily and quickly completely off or out of the pulley B.

The conditions and mode of operation or use will vary as between different makes of automobiles due to the different constructions of fans, fan pulleys, location and arrangement of the water-hose connections and the like. In some cases, application of the foot 5 to the rear of the pulley B with the flat face 11 functioning to prevent twisting of the tool as a whole will be desirable, while in some cases it will not be practical to bring either flat face 9 or 11 into contact with the hub or other supporting or steadying face and instead it will be necessary to insert the foot 5 through the loop of the belt below the pulley B and then pull the tool with its shoulder 3 spanning the groove of the pulley upward until the shoulder 3 passes over dead center of the pulley axis while at the same time applying pressure in the direction as indicated by the upper arrow in Fig. 3.

To apply a belt the same is first slipped over the fan, not shown and applied about the usual drive pulley, not shown, and any other pulleys, not shown, about which the belt is to be passed or which are to be driven by the belt. The upper portion of the belt is given a half turn or twist as illustrated in Fig. 4 and the arm 2 of the tool is inserted through the loop of the belt, the notch 4 of the upper or outer face of said arm hooking over or receiving the uppermost portion of the front flange of the pulley B and the normally outer peripheral face of the belt A engaging the curved face of the arm 2. With the parts in the foregoing relation, the tool is to be swung rearward in the direction indicated by the arrow in Fig. 4. This results in stretching the belt A and at the same time changing the position of the arm A, raising all of it except its extreme tip above the uppermost portion of pulley B, at which time it will be downwardly inclined lengthwise and the resulting tension of the belt A will cause it to slide and roll down such incline, untwisting itself and snapping into the groove of the pulley B.

I claim:

1. A belt removing and replacing tool comprising a shank, a foot offset from the lower end portion of said shank, a downwardly inclined belt engaging and stretching removing shoulder connecting said shank and foot and having an operative face convexly curved in cross-section, and a belt engaging and stretching applying arm extending from the upper end portion of said shank and downwardly inclined away therefrom, the lower inner face of said applying arm being convexly curved in cross-section, said arm having a notch formed in its upper outer face portion closely adjacent its free end, said shank, foot, shoulder and arm all being integral and of substantially semi-spherical shape in cross-section, and said foot being twisted through approximately 90 degrees about its axis and having its lower portion formed with substantially parallel plane faces functioning to resist a tendency of the tool to twist or turn bodily about its general axis during use in removing a belt.

2. A belt removing and replacing tool comprising a shank, a foot offset from the lower end portion of said shank, a downwardly inclined belt engaging and stretching removing shoulder connecting said shank and foot and having an operative face convexly curved in cross-section, and a belt engaging and stretching applying arm extending from the upper end portion of said shank and downwardly inclined away therefrom, the lower inner face of said applying arm being convexly curved in cross-section, said arm having a notch formed in its upper outer face portion closely adjacent its free end, said shank, foot, shoulder and arm all being integral and of substantially semi-spherical shape in cross-section, and said foot being twisted through approximately 90 degrees about its axis.

3. A belt removing and replacing tool comprising a shank, a foot offset from the lower end portion of said shank and a downwardly inclined shoulder connecting said shank and foot, said shank, foot and shoulder all being integral and of substantially semi-spherical shape in cross-section and said foot being twisted on its axis at approximately right angles to its former position.

MACKEY K. MALONE.